US012685319B2

(12) United States Patent
Zeng et al.

(10) Patent No.: US 12,685,319 B2
(45) Date of Patent: Jul. 21, 2026

(54) METHOD AND DEVICE FOR PURINE REDUCTION, AND EQUIPMENT AND ELECTRONIC EQUIPMENT AND STORAGE MEDIUM

(71) Applicants: HEFEI MIDEA REFRIGERATOR CO., LTD., Hefei (CN); HEFEI HUALING CO., LTD., Hefei (CN); MIDEA GROUP CO., LTD., Foshan (CN)

(72) Inventors: Qingqing Zeng, Hefei (CN); Xiaoyan Li, Hefei (CN); Zhe Wang, Hefei (CN)

(73) Assignees: HEFEI MIDEA REFRIGERATOR CO., LTD., Hefei (CN); HEFEI HUALING CO., LTD., Hefei (CN); MIDEA GROUP CO., LTD., Foshan (CN)

( * ) Notice: Subject to any disclaimer, the term of this patent is extended or adjusted under 35 U.S.C. 154(b) by 181 days.

(21) Appl. No.: 18/003,868

(22) PCT Filed: Dec. 24, 2021

(86) PCT No.: PCT/CN2021/141385
§ 371 (c)(1),
(2) Date: Dec. 29, 2022

(87) PCT Pub. No.: WO2022/257432
PCT Pub. Date: Dec. 15, 2022

(65) Prior Publication Data
US 2024/0292850 A1 Sep. 5, 2024

(30) Foreign Application Priority Data
Jun. 11, 2021 (CN) .......................... 202110655191.5

(51) Int. Cl.
A23B 4/06 (2006.01)
A23B 4/015 (2006.01)
(Continued)

(52) U.S. Cl.
CPC ................ *A23B 4/06* (2013.01); *A23B 4/015* (2013.01); *A23B 4/16* (2013.01); *F25D 29/00* (2013.01)

(58) Field of Classification Search
CPC .. A23B 4/015; A23B 4/16; A23B 2/50; A23B 2/53; A23B 2/60; A23B 2/80;
(Continued)

(56) References Cited

U.S. PATENT DOCUMENTS 1,907,649 A * 5/1933 Marx ................... A23B 2/8033
62/380
3,395,549 A * 8/1968 Grimes .............. A61K 51/1241
62/375
(Continued)

FOREIGN PATENT DOCUMENTS

CN 1157400 A 8/1997
CN 103610125 A 3/2014
(Continued)

OTHER PUBLICATIONS

Translation of CN 108740706A (Year: 2018).*
(Continued)

*Primary Examiner* — Drew E Becker
(74) *Attorney, Agent, or Firm* — K&L Gates LLP

(57) ABSTRACT

The present application relates to the field of food processing technology, and provides a method and a device for purine reduction, and an equipment and an electronic equipment and a storage medium. The method for purine reduction includes the following steps: first cooling step: performing first cooling treatment on a food material to be treated at
(Continued)

performing first cooling treatment on a food material to be treated at a first preset cooling rate to reduce a temperature of the food material to be treated to a temperature below a freezing point —110 continuously cooling the food material to be treated after performing first cooling treatment to cool the food material to be treated to a slightly frozen state —120 performing fresh-keeping storage on the food material to be treated in a slightly frozen state —130 a first preset cooling rate to reduce a temperature of the food material to be treated to a temperature below a freezing point. By performing first cooling treatment on a food material to be treated at a first preset cooling rate to reduce a temperature of the food material to be treated to a temperature below a freezing point, the activity of ATP-degrading enzyme in the food material to be treated can be rapidly inhibited, which can quickly and effectively inhibit the generation of hypoxanthine, thereby reducing the generation of hypoxanthine, reducing the risk of hyperuricemia and gout, and having little effect on the taste and quality of the food material.

9 Claims, 3 Drawing Sheets

(51) Int. Cl.
    *A23B 4/16*           (2006.01)
    *F25D 29/00*        (2006.01)

(58) Field of Classification Search
    CPC ....... A23B 4/10; A23B 7/015; A23B 4/06–09;
                      F25D 29/00; F25D 11/00; A23L 5/30;
                                        A23L 17/00
    See application file for complete search history.

(56)               References Cited

U.S. PATENT DOCUMENTS

| | | | | | |
|---|---|---|---|---|---|
| 3,729,948 | A | * | 5/1973 | Schwartz | A23B 2/805 |
| | | | | | 62/185 |
| 4,087,265 | A | * | 5/1978 | Benson | A23B 4/062 |
| | | | | | 62/380 |
| 4,396,636 | A | * | 8/1983 | Mitsuda | A23B 4/066 |
| | | | | | 426/418 |
| 4,832,972 | A | * | 5/1989 | Toledo-Flores | A23B 4/16 |
| | | | | | 426/524 |
| 6,007,864 | A | * | 12/1999 | Goodband | A23B 4/06 |
| | | | | | 426/643 |
| 6,440,484 | B1 | * | 8/2002 | Tanaka | A23L 17/75 |
| | | | | | 426/643 |
| 2004/0247770 | A1 | * | 12/2004 | Miller | A22C 9/00 |
| | | | | | 426/641 |
| 2005/0048188 | A1 | * | 3/2005 | Okuda | A23B 4/16 |
| | | | | | 426/643 |
| 2005/0136161 | A1 | * | 6/2005 | Okita | A23B 2/80 |
| | | | | | 426/393 |
| 2006/0127545 | A1 | * | 6/2006 | Newman | A23B 4/01 |
| | | | | | 426/326 |
| 2006/0286274 | A1 | * | 12/2006 | Tsai | A23L 17/00 |
| | | | | | 426/643 |
| 2007/0122532 | A1 | * | 5/2007 | Tsai | A23B 4/06 |
| | | | | | 426/393 |
| 2007/0237883 | A1 | * | 10/2007 | Mishima | A23L 17/00 |
| | | | | | 426/643 |
| 2008/0286407 | A1 | * | 11/2008 | Lee | A22B 3/083 |
| | | | | | 426/2 |
| 2009/0277342 | A1 | * | 11/2009 | Jetton | A23B 4/08 |
| | | | | | 99/536 |
| 2016/0050945 | A1 | * | 2/2016 | Sun | A23L 5/32 |
| | | | | | 426/238 |
| 2020/0404934 | A1 | * | 12/2020 | Verhoeven | A01N 1/00 |
| 2023/0099623 | A1 | * | 3/2023 | Balabolin | A23B 2/60 |
| | | | | | 426/231 |
| 2024/0099318 | A1 | * | 3/2024 | Byeon | A23B 2/003 |

FOREIGN PATENT DOCUMENTS

| | | |
|---|---|---|
| CN | 105325924 A | 2/2016 |
| CN | 105716351 A | 6/2016 |
| CN | 106490515 A | 3/2017 |
| CN | 110226621 A | 9/2019 |
| CN | 110742119 A | 2/2020 |
| CN | 110849067 A | 2/2020 |
| CN | 112244201 A | 1/2021 |
| CN | 112545295 A | 3/2021 |

OTHER PUBLICATIONS

Translation of CN 108477534A (Year: 2018).*
Ultrasound Technology for Fish Processing and Preservation, Pooja Saklani, K.C. Dora, Shiv Mohan Singh, Ashutosh Lowansi, published Mar. 12, 2021, Indian Farmer, vol. 8 (03) (Year: 2021).*
The First search report of Chinese Priority Application No. 202110655191.5, dated Nov. 2, 2023, 6 pages with English translation.

* cited by examiner

METHOD AND DEVICE FOR PURINE REDUCTION, AND EQUIPMENT AND ELECTRONIC EQUIPMENT AND STORAGE MEDIUM

CROSS-REFERENCE TO RELATED APPLICATION

The present application claims priority to Chinese Application No. 202110655191.5, filed on Jun. 11, 2021, entitled "Method and Device for Purine reduction, and Equipment and Electronic Equipment and Storage Medium", which is hereby incorporated by reference in its entity.

TECHNICAL FIELD

The present application relates to the technical field of food processing technologies, in particular to a method and a device for purine reduction, and an equipment and an electronic equipment and a storage medium.

BACKGROUND

Gout and hyperuricemia are becoming a socialized problem. It is reported that the number of hyperuricemia patients in China has reached 170 million, and the number of gout patients has reached nearly 100 million. Both hyperuricemia and gout are purine metabolic disorders caused by excessive uric acid generation or insufficient excretion. The final product metabolized by purine in human body is uric acid. Uric acid can be used as an antioxidant in the human body to resist the damage of reactive oxygen species. Uric acid supply is very important for protecting the blood vessels of the human body, but frequent and large intake of high purine content foods will increase serum uric acid concentration and increase the risk of hyperuricemia and gout. During the generation of uric acid, hypoxanthine in purine can be directly oxidized and decomposed into uric acid by oxidase (XOD) in one step. Aquatic meat is rich in protein and other nutrients, and has high purine content, especially has high hypoxanthine content. Therefore, excessive intake of aquatic meat rich in hypoxanthine is extremely unfavorable for uric acid control in patients with gout and hyperuricemia.

A traditional purine reduction approach by food material is cumbersome, and has long treatment time, and the taste of the food material itself is greatly changed, resulting in the loss of some nutrients, such as amino acids.

SUMMARY

The present application solves at least one of the problems existing in the related art. The present application provides a method for purine reduction. The method for purine reduction provided by the present application is to inhibit the activity of ATP-degrading enzyme in the food material to be treated by cooling, and reduce the secretion of exogenous enzyme generated by microbial regeneration, thereby reducing the generation of hypoxanthine. The method is simple to operate, can significantly inhibit the generation of hypoxanthine in the food material to be treated, and has little effect on the taste and quality of the food material.

The present application further provides a device for purine reduction.

The present application further provides a refrigeration equipment.

The present application further provides an electronic equipment.

The present application further provides a non-transitory computer readable storage medium.

The method for purine reduction provided by embodiments of the present application includes the following steps:

first cooling step: performing first cooling treatment on a food material to be treated at a first preset cooling rate to reduce a temperature of the food material to be treated to a temperature below a freezing point.

According to the method for purine reduction of embodiments of the present application, by performing first cooling treatment on a food material to be treated at a first preset cooling rate to reduce a temperature of the food material to be treated to a temperature below a freezing point, the activity of ATP-degrading enzyme in the food material to be treated can be rapidly inhibited, which can quickly and effectively inhibit the generation of hypoxanthine. By continuously cooling the food material to be treated to a slightly frozen state, it can effectively inhibit the activity of ATP-degrading enzyme in the food material to be treated and reduce the secretion of exogenous enzyme generated by microbial regeneration, thereby reducing the generation of hypoxanthine, reducing the risk of hyperuricemia and gout, and having little effect on the taste and quality of the food material.

According to an embodiment of the present application, after performing the first cooling step, the following step is further performed:

second cooling step: continuously cooling the food material to be treated after performing the first cooling treatment to cool the food material to be treated to a slightly frozen state.

According to an embodiment of the present application, the method further includes fresh-keeping storage step: performing fresh-keeping storage on the food material to be treated in a slightly frozen state.

According to an embodiment of the present application, during the second cooling step or the fresh-keeping storage step, auxiliary sterilization treatment is performed on the food material to be treated; or, during the second cooling step and the fresh-keeping storage step, auxiliary sterilization treatment is performed on the food material to be treated.

According to an embodiment of the present application, the step of performing auxiliary sterilization treatment on the food material to be treated includes:

performing auxiliary sterilization treatment on the food material to be treated by using at least one of UV sterilization technology, slow-release sterilization technology, photodynamic sterilization technology, plasma sterilization technology and ozone sterilization technology.

According to an embodiment of the present application, blunt enzyme treatment is performed on the food material to be treated during the step of the fresh-keeping storage step.

According to an embodiment of the present application, the step of performing blunt enzyme treatment on the food material to be treated includes:

performing passivation on endogenous enzyme of the food material to be treated by using at least one of magnetic field passivation technology, electric field passivation technology, ultrasonic passivation technology and high-pressure passivation technology.

According to an embodiment of the present application, before performing the first cooling step, the following steps are performed:

obtaining a temperature of the food material to be treated; and turning into the first cooling step if it is determined that the temperature of the food material to be treated is not higher than a preset temperature.

According to an embodiment of the present application, the method further includes:

determining the temperature of the food material to be treated is higher than the preset temperature, and precooling the food material to be treated according to a second preset cooling rate.

According to an embodiment of the present application, a cooling rate during continuously cooling the food material to be treated after the first cooling treatment is less than the first preset cooling rate, and the second preset cooling rate is less than the first preset cooling rate.

According to an embodiment of the present application, the food material to be treated is aquatic product of which the internal viscera as well as shell or scale has been removed in advance and cleaned.

According to an embodiment of the present application, the first preset cooling rate is 0.2° C./min to 2° C./min and the temperature below freezing point is −2° C. to 0° C.

According to an embodiment of the present application, the fresh-keeping storage is performed on the food material to be treated under a temperature from −7° C. to 0° C.

The device for purine reduction provided by embodiments of the present application includes:

cooling module, configured for performing first cooling treatment on a food material to be treated at a first preset cooling rate to reduce a temperature of the food material to be treated to a temperature below a freezing point.

The device for purine reduction according to embodiments of the present application is simple in operation and can effectively inhibit the activity of ATP-degrading enzyme in the food material to be treated and reduce the secretion of exogenous enzyme generated by microbial regeneration, thereby reducing the generation of hypoxanthine.

The refrigeration equipment provided by embodiments of the present application includes:

a cooling device, configured for performing first cooling treatment of food material to be treated at a first preset cooling rate to reduce a temperature of the food material to be treated to a temperature below a freezing point; and a processor, configured for controlling the cooling device to perform the above method for purine reduction.

According to an embodiment of the present application, the refrigeration equipment further includes:

a sterilization device, configured for performing auxiliary sterilization treatment on the food material to be treated.

The electronic equipment provided by embodiments of the present application includes a memory, a processor and a computer program stored in the memory and executable by the processor, where when the program is executed by the processor, steps of the method for purine reduction are performed.

The non-transitory computer readable storage medium provided by embodiments of the present application, having computer program stored therein, where when the program is executed by the processor, steps of the method for purine reduction is performed.

One or more of the above solutions in embodiments of the present application have at least one of the following technical effect.

According to the method for purine reduction of embodiments of the present application, by performing first cooling treatment on a food material to be treated at a first preset cooling rate to reduce a temperature of the food material to be treated to a temperature below a freezing point, the activity of ATP-degrading enzyme in the food material to be treated can be rapidly inhibited, which can quickly and effectively inhibit the generation of hypoxanthine. By continuously cooling the food material to be treated to a slightly frozen state, it can effectively inhibit the activity of ATP-degrading enzyme in the food material to be treated and reduce the secretion of exogenous enzyme generated by microbial regeneration, thereby reducing the generation of hypoxanthine, reducing the risk of hyperuricemia and gout, and having little effect on the taste and quality of the food material.

Further, the device for purine reduction according to embodiments of the present application is simple in operation and can effectively inhibit the activity of ATP-degrading enzyme in the food material to be treated and reduce the secretion of exogenous enzyme generated by microbial regeneration, thereby reducing the generation of hypoxanthine.

Additional aspects and advantages of the present application are set forth, in part, from the following description, and the part will become clear from the following description, or is learned by practice of the present application.

BRIEF DESCRIPTION OF DRAWINGS

To more clearly illustrate embodiments of the present application or prior art, accompanying drawings used in the description of embodiments or the prior art are briefly introduced below. It should be noted that, the drawings in the following description only show some embodiments of the present application. For those of ordinary skill in the art, other drawings may also be obtained according to these drawings without creative effort.

DETAILED DESCRIPTION OF THE EMBODIMENTS

Figure 1:
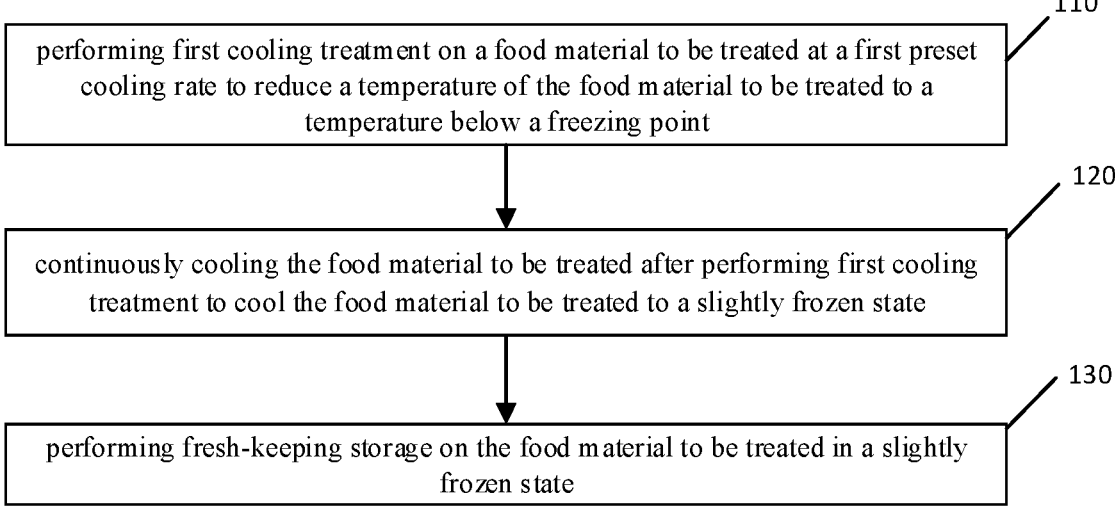
FIG. 1 is a first flow diagram of a method for purine reduction provided by an embodiment of the present application.

The implementation of the present application is further described in detail below in combination with the accompanying drawings and embodiments. The following embodiments are used to describe the present application, but cannot be used to limit the scope of the present application.

In the description of the present application, it is to be noted that, the orientation or positional relations specified by terms such as "central", "longitudinal", "transverse", "upper", "lower", "front", "back", "left", "right", "vertical", "horizontal", "top", "bottom", "inner", "outer" and the like, are based on the orientation or positional relations shown in the drawings, which is merely for convenience of description of the present application and to simplify description, but does not indicate or imply that the stated devices or members must have the particular orientation and be constructed and operated in a particular orientation, and thus it is not to be construed as limiting the present application. Furthermore, the terms "first", "second", "third" and the like are only configured for descriptive purposes and should not be construed as indicating or implying a relative importance.

In the description of the present application, it is to be noted that unless explicitly specified and defined otherwise, the terms "connected to" and "connected" shall be understood broadly, for embodiment, it may be either fixedly connected or detachably connected, or can be integrated; it may be either mechanically connected, or electrically connected; it may be either directly connected, or indirectly connected through an intermediate medium. The specific meanings of the terms above in the present application can be understood by a person skilled in the art in accordance with specific conditions.

In embodiments of the present application, unless otherwise expressly specified and defined, a first feature is "on" or "under" a second feature can refer to that the first feature is directly contacted with the second feature, or the first feature is indirectly contacted with the second feature through an intermediate medium. And further, the first feature is "on", "above" and "over" the second feature can refer to that the first feature is directly above or obliquely above the second feature, or simply refer to that the stage height of the first feature is higher than that of the second feature. The first feature is "under", "below" and "beneath" the second feature can refer to that the first feature is directly below or obliquely below the second feature, or simply refer to that the stage height of the first feature is lower than that of the second feature.

In the description of this specification, description with reference to the terms "one embodiment", "some embodiments", "an embodiment", "specific embodiment", "some embodiments" and the like, refers to that specific features, structures, materials or characteristics described in combination with an embodiment or an embodiment are included in at least one embodiment or embodiment according to embodiments of the present application. In this specification, schematic representations of the above terms are not necessarily directed to a same embodiment or embodiment. Furthermore, the particular features, structures, materials or characteristics described can be combined in any suitable manner in any one or more embodiments or embodiments. In addition, those skilled in the art may combine the different embodiments or embodiments described in this specification, as well as the features of the different embodiments or embodiments, without conflicting each other.

Aquatic meat has high content of hypoxanthine (Hx), and hypoxanthine is mainly generated by ATP-degrading enzyme in animals after death. In order to control the generation of hypoxanthine in aquatic meat, on one hand, it can be achieved by inhibiting the activity of IMP degrading enzyme (acid phosphatase-ACP). On the other hand, due to the continuous generation of bacteria in aquatic meat during storage, these bacteria will secrete some exogenous enzyme to induce IMP degradation, so it can be achieved by inhibiting the activity of exogenous enzyme. On one hand, the method for purine reduction provided by embodiments of the present application performs first cooling treatment on the food material to be treated at a first preset cooling rate, and rapidly cools the food material to be treated to a temperature below a freezing point of the food material to be treated, which can rapidly inhibit the activity of ATP-degrading enzyme in the food material to be treated, thereby quickly and effectively inhibiting the generation of hypoxanthine. On the other hand, it continuously cooling the food material to be treated to a slightly frozen state, which can effectively inhibit the activity of ATP-degrading enzyme in the food material to be treated and reduce the secretion of exogenous enzyme generated by microbial regeneration, thereby reducing the generation of hypoxanthine.

The method for purine reduction of the present application includes the following steps.

In step 110, first cooling treatment is performed on a food material to be treated at a first preset cooling rate to reduce a temperature of the food material to be treated to a temperature below a freezing point.

According to the method for purine reduction of embodiments of the present application, by performing first cooling treatment on a food material to be treated at a first preset cooling rate to reduce a temperature of the food material to be treated to a temperature below a freezing point, the activity of ATP-degrading enzyme in the food material to be treated can be rapidly inhibited, which can quickly and effectively inhibit the generation of hypoxanthine. By continuously cooling the food material to be treated to a slightly frozen state, it can effectively inhibit the activity of ATP-degrading enzyme in the food material to be treated and reduce the secretion of exogenous enzyme generated by microbial regeneration, thereby reducing the generation of hypoxanthine, reducing the risk of hyperuricemia and gout, and having little effect on the taste and quality of the food material.

According to an embodiment of the present application, after performing the first cooling step, the following step is further performed.

In second cooling step, continuously cooling is performed on the food material to be treated after performing the first cooling treatment to cool the food material to be treated to a slightly frozen state.

According the method for purine reduction of embodiments of the present application, by continuously cooling the food material to be treated to a slightly frozen state, it can effectively inhibit the activity of ATP-degrading enzyme in the food material to be treated and reduce the secretion of exogenous enzyme generated by microbial regeneration, thereby reducing the generation of hypoxanthine, reducing the risk of hyperuricemia and gout, and having little effect on the taste and quality of the food material.

According to an embodiment of the present application, after performing the second cooling step, the following steps is further performed.

In fresh-keeping storage step, fresh-keeping storage is performed on the food material to be treated in a slightly frozen state.

According to embodiments of the present application, FIG. 1 is a first flow diagram of a method for purine reduction provided by an embodiment of the present application. As shown in FIG. 1, the method for purine reduction includes the following steps:

in step 110, first cooling treatment is performed on the food material to be treated at a first preset cooling rate to reduce a temperature of the food material to be treated to a temperature below a freezing point;

in step 120, continuously cooling is performed on the food material to be treated after performing first cooling treatment to cool the food material to be treated to a slightly frozen state; and in step 130, fresh-keeping storage is performed on the food material to be treated in a slightly frozen state.

It should be noted that the cooling rate during a process of continuously cooling the food material to be treated is less than the first preset cooling rate, which maintains a good taste of the food material to be treated. The step 110 is the first cooling step, the step 120 is the second cooling step, and the step 130 is the fresh-keeping storage step.

According to methods for purine reduction of embodiments of the present application, by performing first cooling treatment on the food material to be treated at a first preset cooling rate to reduce a temperature of the food material to be treated to a temperature below a freezing point, the activity of ATP-degrading enzyme in the food material to be treated can be rapidly inhibited, which can quickly and effectively inhibit the generation of hypoxanthine. By continuously cooling the food material to be treated to a slightly frozen state, it can effectively inhibit the activity of ATP-degrading enzyme in the food material to be treated and reduce the secretion of exogenous enzyme generated by microbial regeneration, thereby reducing the generation of hypoxanthine, reducing the risk of hyperuricemia and gout, and having little effect on the taste and quality of the food material. According to embodiments of the present application, the food material to be treated is fresh aquatic products, which can be freshwater fish, such as grass carp, marine fish, such as perch, or shrimp shellfish, such as grass shrimp. When the food material to be treated is fish, it is necessary to remove fish scales and viscera before the first cooling step. When the food material to be treated is shrimp and shellfish, the shell and offal need to be removed before the first cooling step.

According to embodiments of the present application, when performing the second cooling step or the fresh-keeping storage step, auxiliary sterilization treatment is performed on the food material to be treated; or, when performing the second cooling step and the fresh-keeping storage step, auxiliary sterilization treatment is performed on the food material to be treated. The auxiliary sterilization treatment of the food material to be treated by cooling treatment can further inhibit the activity of ATP-degrading enzyme in the food material to be treated and reduce the secretion of exogenous enzyme generated by microbial regeneration, thereby reducing the generation of hypoxanthine and reducing the risk of hyperuricemia and gout.

According to embodiments of the present application, the performing auxiliary sterilization treatment on the food material to be treated includes: auxiliary sterilization treatment is performed on the food material to be treated by using at least one of UV sterilization technology, slow-release sterilization technology, photodynamic sterilization technology, plasma sterilization technology and ozone sterilization technology used to sterilize the food material.

According to embodiments of the present application, ultraviolet sterilization technology is to use ultraviolet light to destroy the molecular structure of DNA (deoxyribonucleic acid) or RNA (ribonucleic acid) in microorganisms. Generally, ultraviolet light with wavelength in the range of 240 nm-280 nm is selected to cause growth cell death and/or regenerative cell death through ultraviolet light, so as to achieve the effect of sterilization and disinfection. Especially, the wavelength of 253.7 nm ultraviolet light has the best sterilization effect. This band coincides with the ultraviolet absorption and photochemical sensitivity range of deoxyribonucleic acid in the microbial nucleus, so has the best sterilization effect.

According to embodiments of the present application, the slow-release sterilization technology reduces the generation of hypoxanthine by inhibiting the growth of microorganisms.

According to embodiments of the present application, photodynamic sterilization technology is a new type of sterilization method, which can use a specific wavelength of light source to irradiate a non-toxic and side-effect photosensitizer. The generated singlet oxygen and reactive oxygen species have a destructive effect on the cell structure of microorganisms, which leads to cell damage or even death. This sterilization method has the advantages of safety, low energy consumption and low cost.

According to the embodiment of the present application, the plasma sterilization technology is to use the charged particles generated by the high-frequency electric field to form plasma, hydroxyl radicals and ultraviolet light, which have a strong interaction with microorganisms, and thus constitute a comprehensive killing environment for microorganisms. In particular, hydroxyl radicals can react with almost all the molecules of living cells to kill microorganisms such as bacteria.

According to a viewpoint of molecular biology, microorganisms are electrified, and the electric charge on the normal cell membrane contributes to the absorption of nutrients by the cells. However, when the microbial cells are affected by electrified particles, the electric charge distribution of microorganisms is completely destroyed under the action, bombardment and irradiation of plasma high-frequency electromagnetic fields, high-energy particles, free radicals and ultraviolet light. For embodiment, the cell wall and nucleus are electrically broken, and the electric charge distribution on them is destroyed, which directly affects the physiological activity and metabolism of microbial cells, and ultimately leads to the rapid death of microorganisms on the surface of the food material to be treated.

Ozone sterilization technology is to destroy the structure of microbial membrane by the oxidation of oxygen atoms to achieve sterilization effect. The inactivation of microorganisms by ozone is always very rapid. Unlike other fungicides, ozone can react with the double bond of microbial cell wall lipids, penetrate into the interior of microorganisms, act on proteins and lipopolysaccharides, and change the permeability of cells, resulting in microbial death. Ozone also acts on nuclear substances in cells, such as purine in nucleic acids. Ozone first acts on the cell membrane, causing damage to the components of the cell membrane, resulting in metabolic disorders. Ozone continues to penetrate the cell membrane, destroys lipoproteins and lipopolysaccharides in the membrane, changes cell permeability, and leads to apoptosis.

It should be noted that in the specific implementation processes of the above several auxiliary sterilization treatment technologies, only one of them can be implemented, or several technologies can be combined to implement. Auxiliary sterilization technology is not limited to the above technologies, can also be other technologies suitable for food sterilization technology.

By combining a cooling treatment technology with the auxiliary sterilization treatment technology, the purine generated in the storage process of the food material to be treated is effectively reduced. The purine reduction technology is not only simple to operate, but also has little effect on the taste and quality of the food material.

Referring to Table 1, the hypoxanthine reduction rate is related to the different auxiliary sterilization technologies when it is under a same storage temperature and a same storage time. The hypoxanthine reduction rate is a ratio compared with the food material to be treated stored in the same storage time at 4° C.

Through Table 1, it can be learnt clearly that the hypoxanthine reduction rate in the control group without auxiliary sterilization treatment has reached 55.56%, and the reduction of hypoxanthine is obvious. Therefore, it should be noted that cooling treatment technology is a main solution to reduce hypoxanthine. By comparing the hypoxanthine reduction rate in the control group without auxiliary sterilization treatment with the hypoxanthine reduction rate in the treatment groups with auxiliary sterilization treatment, it can be learnt that hypoxanthine is further decreased after assisted sterilization. By comparing different auxiliary sterilization technologies, it can be learnt that photodynamic sterilization technology corresponds to the largest hypoxanthine reduction rate under the same temperature and the same storage time.

TABLE 1

Purine reduction effect of different
auxiliary sterilization technologies

| Auxiliary sterilization technology | Temperature (° C.) | Storage time (h) | Reduction rate of hypoxanthine content/% |
|---|---|---|---|
| Group without auxiliary sterilization treatment | −3° C. | 24 h | 55.56% |
| UV sterilization technology | | | 60.76% |
| Slow-release sterilization technology | | | 58.35% |
| Photodynamic sterilization technology | | | 65.86% |
| Plasma sterilization technology | | | 63.27% |
| Ozone sterilization technology | | | 62.81% |

It should be noted that the auxiliary sterilization treatment technologies are not limited to the above solutions, and other solution can also be configured for auxiliary sterilization treatment.

According to embodiments of the present application, blunt enzyme treatment is performed on the food material to be treated when performing the fresh-keeping storage step, which can further inhibit the activity of endogenous enzyme such as ATP-degrading enzyme and further reduce the accumulation of hypoxanthine.

According to embodiments of the present application, the performing blunt enzyme treatment on the food material to be treated includes: passivation on endogenous enzyme of is performed on the food material to be treated by using at least one of magnetic field passivation technology, electric field passivation technology, ultrasonic passivation technology and high-pressure passivation technology. By using magnetic field passivation technology, electric field passivation technology, ultrasonic passivation technology and high-pressure passivation technology to passivate the endogenous enzyme of food material, the activity of endogenous enzyme such as ATP-degrading enzyme can be further inhibited, and the accumulation of hypoxanthine can be further reduced.

The high-pressure blunt enzyme technology refers to the use of high-pressure gas to inhibit the activity of the enzyme. High-pressure gas refers to the gas with a standard atmospheric pressure of more than 1.5 times. Since the above-mentioned blunt enzyme treatment technologies are conventional solution in actual generation, they are not introduced in detail here.

Referring to Table 2, Table 2 shows the hypoxanthine reduction rate of different blunt enzyme treatment technologies at the same temperature and the same storage time. The hypoxanthine reduction rate is a ratio compared with the food material to be treated stored in the same storage time at 4° C.

Through Table 2, it can be learnt clearly that the hypoxanthine reduction rate in the control group without auxiliary sterilization treatment has reached 55.56%, and the reduction of hypoxanthine is obvious. Therefore, it can be learnt that cooling treatment technology is the main solution to reduce hypoxanthine. Then, the hypoxanthine reduction rate of the control group without blunt enzyme treatment was compared with the hypoxanthine reduction rate of the treatment groups with blunt enzyme treatment. It can be learnt that the auxiliary blunt enzyme technology during a slightly frozen state storage process can further improve the hypoxanthine reduction rate. By comparing different blunt enzyme treatment technologies within the groups, it can be learnt that under the same temperature and the same storage time, the high-pressure blunt enzyme technology corresponds to the maximum hypoxanthine reduction rate.

TABLE 2

Purine reduction effect of different blunt enzyme technologies

| Blunt enzyme technology | Temperature (° C.) | Storage time (h) | Reduction rate of hypoxanthine content/% |
|---|---|---|---|
| Group without blunt enzyme treatment | −3° C. | 24 h | 55.56% |
| Magnetic field passivation technology | | | 62.76% |
| Electric field passivation technology | | | 65.92% |
| Electromagnetic field passivation technology | | | 68.59% |
| Ultrasonic passivation technology | | | 69.57% |
| High-pressure passivation technology | | | 71.42% |

It should be noted that the blunt enzyme technology is not limited to the above solutions, and other solution can also be configured for blunt enzyme treatment.

According to embodiments of the present application, the following steps are performed before the first cooling step:
a temperature of the food material to be treated is obtained; and
the temperature of the food material to be treated is determined to be not higher than a preset temperature, and then the first cooling step is performed.

According to embodiments of the present application, the method further includes:
the temperature of the food material to be treated is determined to be higher than the preset temperature, and the food material to be treated is pre-cooled according to a second preset cooling rate.

According to embodiments of the present application, a cooling rate during a process of continuously cooling the food material to be treated after the first cooling treatment is less than the first preset cooling rate, and the second preset cooling rate is less than the first preset cooling rate.

It should be noted that the purpose of precooling the food material to be treated is to reduce the initial temperature at which the first cooling step is performed. If the freezing time of the food material to be treated is too long, the taste and taste of the food material will become worse, which is due to that the water in the food material will become ice due to freezing. If the ice crystal formed during the freezing process is too large, it will destroy the original cell structure in the food material. When it is thawed, the liquid in the cells will be lost as thawing, which will not only lose the nutrients, but also make the food material soft and collapse. During the pre-cooling process of the food material to be treated, the second preset cooling rate is less than the first preset cooling rate. By reducing the initial temperature of the first cooling step and reducing the difference between the initial temperature value and the temperature below the freezing point of the food material to be treated, the cooling time of the first cooling step can be shortened to ensure that the food material has a good taste.

According to embodiments of the present application, the food material to be treated is aquatic products that have been pre-removed the internal viscera and shell or scale and cleaned. The purpose of removing internal viscera and shells or scale before the first cooling step is that the aquatic products are dead before freezing, but since there is still some water in the aquatic product body, it will accommodate a lot of low temperature resistant microorganisms. These microorganisms will reproduce with the help of the nutrition of aquatic products, and gradually spoil the aquatic products. Therefore, pre-removing internal viscera and the shell or scale and then performing cooling treatment make food material taste good and healthier.

According to embodiments of the present application, the first preset cooling rate is 0.2° C./min to 2° C./min and the temperature below freezing point is −2° C. to 0° C. If the cooling rate is different, the hypoxanthine reduction rate will be different. Referring to Table 3, in the case of the same category of food material to be treated, and the storage temperature and storage time are also the same, the hypoxanthine reduction rate changes with the cooling rate. The hypoxanthine reduction rate is a ratio compared with the food material to be treated stored in the same storage time at 4° C. Through Table 3, it can be learnt that the greater the first preset cooling rate, the greater the hypoxanthine reduction rate.

TABLE 3

Purine reduction effect at different cooling rates

| Food material category | First preset cooling rate | Storage temperature (° C.) | Storage time (h) | Reduction rate of hypoxanthine content/% |
|---|---|---|---|---|
| Grass carp | 0.2° C./min | −3° C. | 24 h | 20.45% |
| | 0.6° C./min | | | 38.17% |
| | 1.0° C./min | | | 49.82% |
| | 1.4° C./min | | | 52.02% |
| | 1.8° C./min | | | 56.35% |

It should be noted that the first preset cooling rate refers to a central cooling rate of a specific size of the food material to be treated. The specific size varies depending on the type of food material. When the food material to be treated is a fish block, the specific size refers to a thickness of the fish block. For example, the thickness of the fish block is specified to be 2 cm, which can also be other sizes. When the food material to be treated is a shrimp, the specific size refers to a diameter of the shrimp. For example, the diameter of the shrimp is 2 cm, which can also be other sizes.

In the same category of food material to be treated and the same storage time, hypoxanthine reduction rate is also related to the storage temperature. Referring to Table 4, when the food material to be treated is a same category and a same storage time, the hypoxanthine reduction rate changes with the storage temperature. The hypoxanthine reduction rate is a ratio compared with the food material to be treated stored in the same storage time at 4° C. Through Table 4, it can be learnt that the lower the storage temperature, the greater the hypoxanthine reduction rate.

TABLE 4

Effect of different storage temperatures on purine reduction

| Food material category | Temperature (° C.) | Storage time (h) | Reduction rate of hypoxanthine content/% |
|---|---|---|---|
| Grass carp | 0° C. | 24 h | 30.65% |
| | −1° C. | | 34.17% |
| | −3° C. | | 51.64% |
| | −7° C. | | 58.60% |

When the storage temperature and storage time are the same, the hypoxanthine reduction rate is also related to the category of food material to be treated. Referring to Table 5, when the storage temperature and storage time the same, the hypoxanthine reduction rate of different categories of food material to be treated is not the same. The hypoxanthine reduction rate is a ratio compared with the food material to be treated stored in the same storage time at 4° C. Through Table 5, it can be learnt clearly that in when the storage temperature and storage time are the same, the hypoxanthine reduction rate of grass carp is the largest.

TABLE 5

Effect of different storage temperatures on purine reduction

| Food material category | Temperature (° C.) | Storage time (h) | Reduction rate of hypoxanthine content/% |
|---|---|---|---|
| Grass carp | −3° C. | 24 h | 55.56% |
| Perch | | | 53.74% |
| Salmon | | | 30.36% |
| Shrimp | | | 43.52% |
| Oysters | | | 30.20% |

According to embodiments of the present application, the temperature below the freezing point is −2° C. to 0° C. It should be noted that the temperature below the freezing point is related to the categories of food material to be treated, and the temperature below the freezing point of different food material to be treated is also different. The temperature below the freezing point is determined according to the category of food material to be treated.

According to embodiments of the present application, the temperature of the food material to be treated for fresh-keeping storage is −7° C. to 0° C. The food material to be treated is in a frozen state for fresh-keeping storage, in addition to reducing the generation of hypoxanthine, but also maintaining the taste of the food material to be treated. This is due to that the slightly frozen state of the food material to be treated is generated in a largest ice crystal zone, where 5% to 30% of the water in the food material to be treated is frozen into ice, and the cell liquid concentration and osmotic pressure of the unfrozen part are increased, which can effectively inhibit the activity of ATP-degrading enzyme in the food material to be treated and reduce the secretion of exogenous enzyme generated by microbial regeneration, thereby reducing the generation of hypoxanthine. The food material to be treated in a frozen state is being performed with fresh-keeping storage continuously, which achieves short-term fresh-keeping storage of food material to be treated, but also maximizes the maintenance of food material taste.

Figure 2:
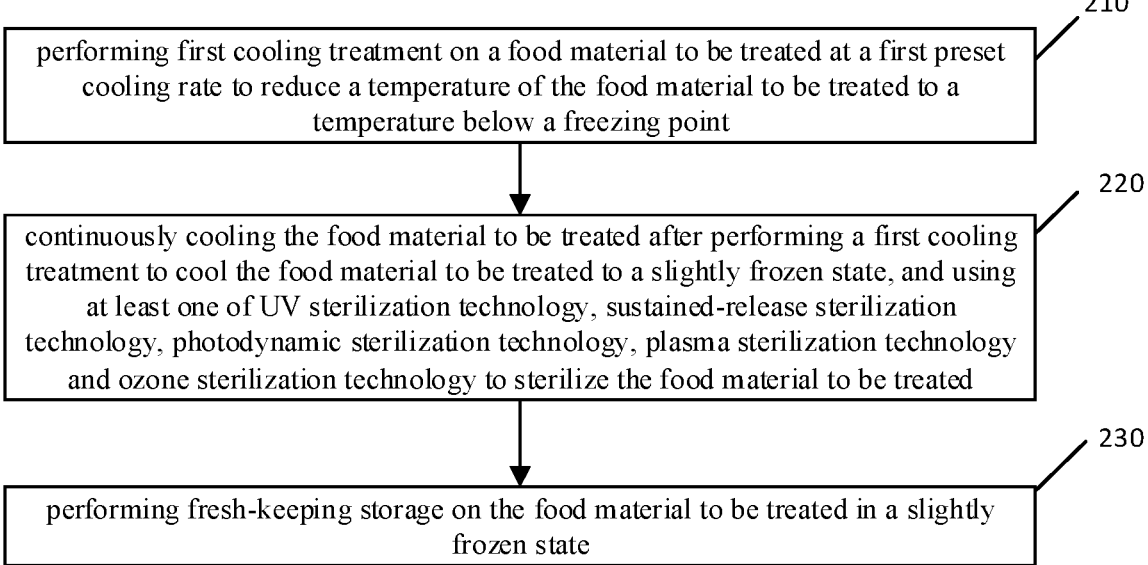
FIG. 2 is a second flow diagram of a method for purine reduction provided by an embodiment of the present application.

According to embodiments of the present application, FIG. 2 is a second flow diagram of a method for purine reduction provided by an embodiment of the present application. As shown in FIG. 2, the method for purine reduction includes the following steps:

in step 210, first cooling treatment is performed on the food material to be treated at a first preset cooling rate to reduce a temperature of the food material to be treated to a temperature below a freezing point;

in step 220, continuously cooling is performed on the food material to be treated after performing first cooling treatment to cool the food material to be treated to a slightly frozen state, and at least one of UV sterilization technology, sustained-release sterilization technology, photodynamic sterilization technology, plasma sterilization technology and ozone sterilization technology is used to sterilize the food material to be treated; and in step 230, fresh-keeping storage is performed on the food material to be treated in a slightly frozen state.

It should be noted that performing continuously cooling on the food material to be treated after the first cooling treatment to a slightly frozen state can effectively inhibit the activity of ATP-degrading enzyme in the food material to be treated, and reduce the secretion of exogenous enzyme generated by microbial regeneration, thereby reducing the generation of hypoxanthine. Combined with ultraviolet sterilization technology, sustained release sterilization technology, photodynamic sterilization technology, plasma sterilization technology and ozone sterilization technology and other auxiliary sterilization technology, it can further kill the microorganisms in the food material to be treated, further inhibit the exogenous enzyme secreted by the microorganisms, thereby reducing the generation of hypoxanthine.

Figure 3:
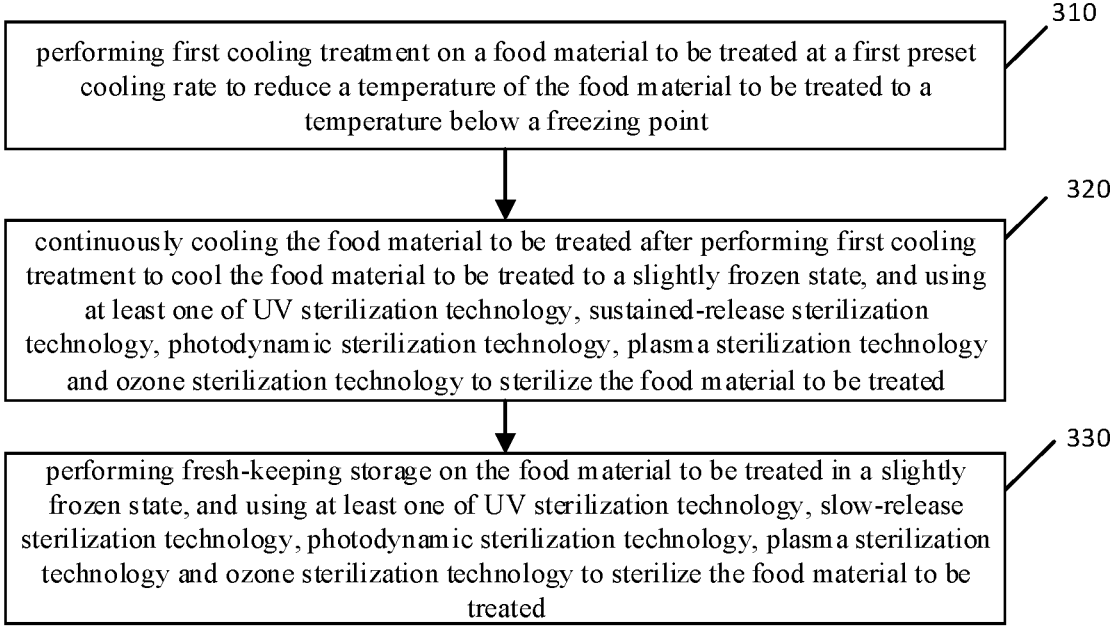
FIG. 3 is a third flow diagram of a method for purine reduction provided by an embodiment of the present application.

According to the embodiment of the present application, FIG. 3 is a third flow diagram of a method for purine reduction provided by an embodiment of the present application. As shown in FIG. 3, the method for purine reduction includes the following steps:

in step 310, first cooling treatment is performed on cooling the food material to be treated at a first preset cooling rate to reduce a temperature of the food material to be treated to a temperature below a freezing point;

in step 320, continuously cooling is performed on the food material to be treated after performing first cooling treatment to cool the food material to be treated to a slightly frozen state, and at least one of UV sterilization technology, sustained-release sterilization technology, photodynamic sterilization technology, plasma sterilization technology and ozone sterilization technology is used to sterilize the food material to be treated; and in step 330, fresh-keeping storage is performed on the food material to be treated in a slightly frozen state, and at least one of UV sterilization technology, slow-release sterilization technology, photodynamic sterilization technology, plasma sterilization technology and ozone sterilization technology is used to sterilize the food material to be treated.

The method for purine reduction in embodiments can further kill the microorganisms in the food material to be treated by combining the auxiliary sterilization treatment technology during preservation and storage process, and further inhibit the exogenous enzyme secreted by the microorganisms, thereby reducing the generation of hypoxanthine.

Figure 4:
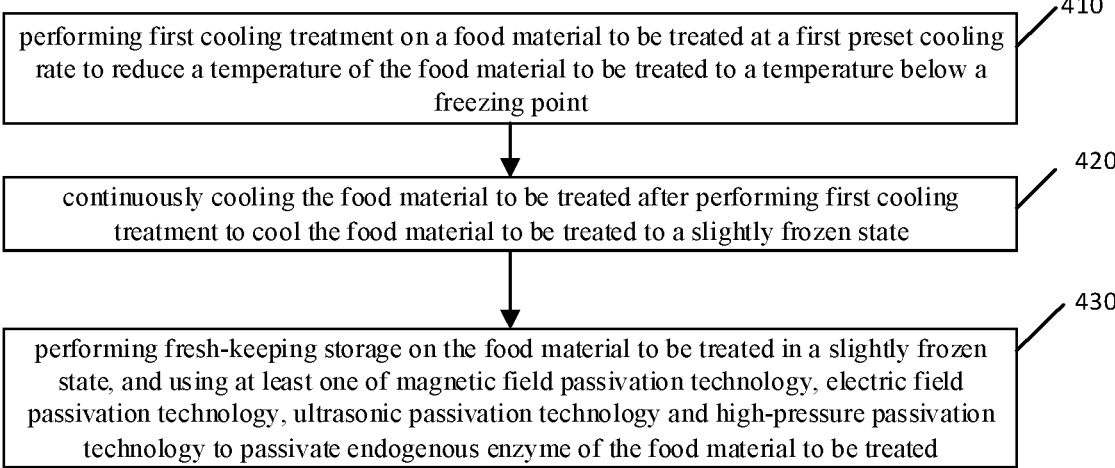
FIG. 4 is a fourth flow diagram of a method for purine reduction provided by an embodiment of the present application.

According to embodiments of the present application, FIG. 4 is a fourth flow diagram of a method for purine reduction provided by an embodiment of the present application. As shown in FIG. 4, the method for purine reduction includes the following steps:

in step 410, first cooling treatment is performed on cooling the food material to be treated at a first preset cooling rate to reduce a temperature of the food material to be treated to a temperature below a freezing point;

in step 420, continuously cooling is performed on the food material to be treated after performing first cooling treatment to cool the food material to be treated to a slightly frozen state;

in step 430, fresh-keeping storage is performed on the food material to be treated in a slightly frozen state, and at least one of magnetic field passivation technology, electric field passivation technology, ultrasonic passivation technology and high-pressure passivation technology is used to passivate endogenous enzyme of the food material to be treated.

The method for purine reduction in embodiments combines the auxiliary blunt enzyme technology during fresh-keeping storage process to blunt the enzyme treatment of the food material to be treated, which can further inhibit the activity of endogenous enzyme such as ATP-degrading enzyme and reduce the accumulation of hypoxanthine.

The device for purine reduction provided by embodiments of the present application includes:

a cooling module, configured for performing first cooling treatment on a food material to be treated at a first preset cooling rate to reduce a temperature of the food material to be treated to a temperature below a freezing point.

According to embodiments of the present application, the device for purine reduction further includes:

a fresh-keeping storage module, configured for performing fresh-keeping storage on the food material to be treated in a slightly frozen state.

where, the cooling module is further configured for continuously cooling the food material to be treated after performing the first cooling treatment to cool the food material to be treated to a slightly frozen state.

The cooling module reduces the temperature of the food material to be treated to below the freezing point according to the first preset cooling rate. The first preset cooling rate is 0.2° C./min to 2° C./min, and the temperature below the freezing point is −2° C. to 0° C.

The cooling module continues to cool the food material to be treated after the first cooling treatment to a slightly frozen state. The slightly frozen state is a microcrystalline state, and the temperature to maintain the slightly frozen state is −7° C. to 0° C.

The fresh-keeping storage module performing fresh-keeping storage on the food material to be treated in a slightly frozen state. The temperature range of fresh-keeping storage is −7° C. to 0° C., and the fresh-keeping storage time is one week.

According to embodiments of the present application, the device for purine reduction further includes a temperature detection module and a pre-cooling module. The pre-cooling module is configured for pre-cooling the food material to be treated according to the second preset cooling rate, so that the temperature of the food material to be treated is lower than the preset temperature. The temperature detection module is configured for detecting the temperature of the food material to be treated.

The refrigeration equipment provided by embodiments of the present application includes:

a cooling device, configured for performing first cooling treatment of food material to be treated at a first preset cooling rate to reduce a temperature of the food material to be treated to a temperature below a freezing point; and a processor, configured for controlling the device for purine reduction mentioned above to perform the method for purine reduction.

According to embodiments of the present application, the refrigeration equipment further includes:

a sterilization device, configured for performing auxiliary sterilization treatment on the food material to be treated.

The refrigeration equipment of this embodiment and the following embodiments can be a refrigerator, a freezer other refrigeration equipment.

The electronic equipment provided by embodiments of the present application includes a memory, a processor and a computer program stored in the memory and executable by the processor, where when the program is executed by the processor, steps of the method for purine reduction of the above embodiments are performed, or the method for purine reduction of the above embodiments is performed.

Figure 5:
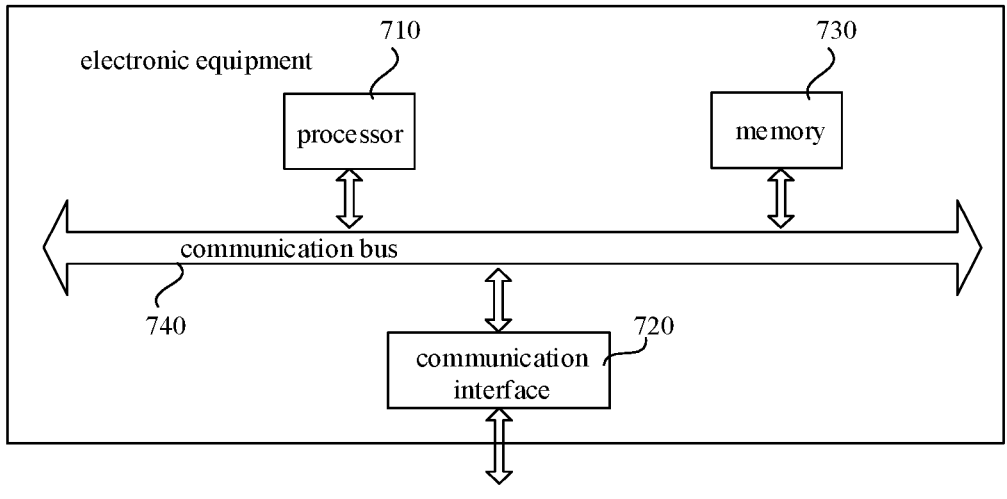
FIG. 5 is an entity structural diagram of an electronic equipment provided by an embodiment of the present application.

FIG. 5 is an entity structure diagram of an electronic equipment provided by an embodiment of the present application. As shown in FIG. 5, the electronic equipment can include: a processor 710, a communication interface 720, a memory 730 and a communication bus 740. The processor 710, the communication interface 720 and the memory 730 communicate with each other through the communication bus 740. The processor 710 can call the logic instruction which is stored in the memory 730 and is executable by processor 710 to perform the method for purine reduction provided by the above method embodiments.

In addition, the logic instructions in the memory 730 can be implemented in the form of software functional units and can be stored in a computer readable storage medium when being sold or used as independent product. Based on such understandings, the solutions of the present application or the part that contributes to the prior art or the part of the solutions can be embodied in the form of a software product in essence. The computer software product is stored in a storage medium, including a number of instructions to enable a computer device, such as personal computer, server, or network device, etc. to perform all or a part of the steps of the methods described in each embodiment of the present application. The aforementioned storage media includes: USB flash disk, mobile hard disk, Read-Only Memory (ROM), Random Access Memory (RAM), magnetic disk, compact disk and other media that can store program codes.

Further, embodiments of the present application further provide a computer program product. The computer program product includes a computer program stored in a non-transitory computer readable storage medium, and the computer program includes program instruction. When the program instruction is executed by the computer, the computer can perform the method for purine reduction provided by the above method embodiments.

The non-transitory computer readable storage medium provided by embodiments of the present application, having computer program stored therein, where when the program is executed by the processor, the method for purine reduction provided by the above method embodiments in the first aspect is performed.

The device embodiments described above is only schematic, in which the unit described as a separation component can be or cannot be physically separated, and the component displayed as a unit can be or cannot be a physical unit. That is, it can be located in a position or can be distributed to multiple network units. Some or all of the modules can be selected according to the actual needs to achieve the purpose of the scheme of embodiments. Those of ordinary skill in the art can understand and implement embodiments without creative labor.

Through the description of the above embodiment methods, those skilled in the art can clearly understand that each embodiment can be realized by software and the necessary general hardware platform, and of course, it can also be realized by hardware. Based on such understandings, the solution in essence or the part that contributes to the prior art can be embodied in the form of a software product. The computer software product can be stored in a computer readable storage medium, such as ROM/RAM, magnetic disk, compact disk, etc., including a number of instructions to enable a computer device, e. g., personal computer, server, or network device, to perform the methods described in each embodiment or some parts of the embodiment.

Finally, it should be noted that the above embodiments are only used to illustrate the solutions of the present application, rather than limiting the solutions. Although the present application is described in detail with reference to the above embodiments, those of ordinary skill in the art should understand that: they may still modify the solutions recorded in the above embodiments, or make equivalent replacements to some of the features; these modifications or replacements do not make the essence of the corresponding solutions depart from the scope of the solutions of various embodiments of the present application.

The above embodiments are only used to illustrate the solutions of the present application, rather than limiting the solutions. Although the present application is described in detail with reference to the above embodiments, those of ordinary skill in the art should understand that the various combinations, modifications or equivalent replacements of the solutions of the present application are not divorced from the scope of the solutions of the present application, and should be covered in the scope of the claims of the present application.

What is claimed is:

1. A purine reduction method, comprising:
    obtaining a core temperature of a food material;
    in response to the core temperature of the food material is higher than a preset temperature, performing pre-cooling the food material according to a second preset cooling rate;
    in response to the core temperature of the food material is not higher than the preset temperature, performing a first cooling treatment on the food material at a first preset cooling rate until the core temperature of the food material reaches a first temperature;
    after performing the first cooling treatment, performing cooling the food material at a third preset cooling rate until the core temperature of the food material reaches a second temperature to cool the food material to a slightly frozen state, wherein 5% to 30% of the water in the food material is frozen into ice;

wherein both the second preset cooling rate and the third preset cooling rate are smaller than the first preset cooling rate.

2. The method according to claim 1, comprising, after performing cooling the food material until the core temperature of the food material reaches the second temperature, performing storage on the food material at the second temperature.

3. The method according to claim 2, comprising performing an auxiliary sterilization treatment on the food material during one or more of the continuously cooling the food material or the performing the storage on the food material.

4. The method according to claim 3, wherein the performing the auxiliary sterilization treatment on the food material comprises:

performing the auxiliary sterilization treatment on the food material by using at least one of UV sterilization technology, photodynamic sterilization technology, plasma sterilization technology or ozone sterilization technology.

5. The method according to claim 2, comprising performing an enzyme inactivation treatment on the food material during the performing the storage.

6. The method according to claim 5, wherein the performing the enzyme inactivation treatment on the food material comprises:

performing inactivation on endogenous enzyme of the food material by using at least one of magnetic field inactivation technology, electric field inactivation technology, or ultrasonic inactivation technology.

7. The method according to claim 1, wherein the food material is an aquatic product, of which one or more of internal viscera, shell or scale has been removed in advance and which has been cleaned.

8. The method according to claim 1, wherein the first preset cooling rate is 0.2° C./min to 2° C./min and the first temperature is between −2° C. and 0° C.

9. The method according to claim 2, wherein the second temperature is between −7° C. and 0° C.

* * * * *